United States Patent
Bando

(10) Patent No.: US 6,743,083 B2
(45) Date of Patent: Jun. 1, 2004

(54) METHOD OF AND APPARATUS FOR REMOVING A FILM LAYER ON A GLASS PLATE AND GLASS-PLATE WORKING APPARATUS HAVING THE APPARATUS

(75) Inventor: Kazuaki Bando, Tokushima (JP)

(73) Assignee: Bando Kiko Co., Ltd., Tokushima (JP)

( * ) Notice: Subject to any disclaimer, the term of this patent is extended or adjusted under 35 U.S.C. 154(b) by 0 days.

(21) Appl. No.: 09/885,446

(22) Filed: Jun. 21, 2001

(65) Prior Publication Data

US 2002/0004355 A1 Jan. 10, 2002

(30) Foreign Application Priority Data

Jun. 27, 2000 (JP) ......................................... 2000-193196

(51) Int. Cl.⁷ ................................................ B24B 1/00
(52) U.S. Cl. ........................ 451/190; 451/194; 451/262
(58) Field of Search .......................... 451/41, 190, 194, 451/195, 257, 132, 262

(56) References Cited

U.S. PATENT DOCUMENTS

| 4,658,550 A | * | 4/1987 | Myers et al. ................... 451/9 |
| 4,716,686 A | | 1/1988 | Lisec |
| 5,616,064 A | * | 4/1997 | Bando ............................ 451/5 |
| 6,416,382 B1 | * | 7/2002 | Bavelloni ....................... 451/5 |
| 6,428,390 B1 | * | 8/2002 | Clark et al. ................... 451/11 |

FOREIGN PATENT DOCUMENTS

| AT | 403 911 | 6/1998 |
| DE | 34 03 682 | 8/1985 |
| DE | 90 04 145.3 | 7/1990 |
| DE | 296 15 085 | 1/1997 |
| DE | 196 32 240 | 11/1997 |
| EP | 0 517 176 | 12/1992 |
| EP | 0 709 348 | 5/1996 |
| EP | 0 769 348 | 4/1997 |
| EP | 0 846 525 | 6/1998 |

\* cited by examiner

*Primary Examiner*—Eileen P. Morgan
(74) *Attorney, Agent, or Firm*—Nixon & Vanderhye

(57) ABSTRACT

An apparatus for removing a film layer on a glass plate includes: a supporting base for supporting a glass plate; a pair of removing devices for removing a film layer on the glass plate; a transporting device for transporting the glass plate; and a control unit for defining in a divided manner a region of a film layer to be removed by the pair of removing devices and for causing the pair of removing devices to concurrently effect removal of the film layer on the glass plate in an apportioned manner with respect to divided regions defined in the divided manner.

7 Claims, 8 Drawing Sheets

METHOD OF AND APPARATUS FOR REMOVING A FILM LAYER ON A GLASS PLATE AND GLASS-PLATE WORKING APPARATUS HAVING THE APPARATUS

BACKGROUND OF THE INVENTION

1. Field of the Invention

The present invention relates to a method of and an apparatus for removing a film layer on a glass plate for removing a film layer formed on one surface of a glass plate which is used as laminated glass or the like for a window of an automobile or as double glazing or the like for a window of a general building, as well as a glass-plate working apparatus having that apparatus.

2. Description of the Related Art

Laminated glass having the function of shielding heat rays, ultraviolet rays, visible rays, or the like is formed such that film layers for shielding heat rays, ultraviolet rays, visible rays, or the like are respectively formed on one surfaces of two glass plates by sputtering (metallic deposition) and are inwardly opposed to each other, and pressure, heat, and the like are applied to the two glass plates with a polyvinyl butyral sheet placed therebetween, thereby bonding the film layers and the polyvinyl butyral sheet. However, since the film layers and the polyvinyl butyral sheet are difficult to bond to each other, the state of their bonding is likely to become incomplete, and moisture, air, and the like can possibly enter peripheral portions of the laminated glass where the state of bonding is incomplete. Consequently, the polyvinyl butyral sheet becomes oxidized and undergoes color development and change. Accordingly, there is a need to remove the film layers at the peripheral portions so as to bond the glass plates and the polyvinyl butyral sheet which are easily bonded to each other. Meanwhile, double glazing having the function of shielding heat rays, ultraviolet rays, visible rays, or the like is formed such that film layers are respectively formed on one surfaces of two glass plates and are inwardly opposed to each other, and in order to obtain a hermetically sealed state between them, spacers are inserted between and bonded to the two glass plates at their peripheral portions by means of a pressure-sensitive adhesive elastic material (hereafter referred to as butyl rubber) formed of butyl and Thiokol (trade name). However, since the film layers and the butyl rubber are difficult to bond to each other, the state of their bonding is likely to become incomplete, and moisture and the like can possibly enter those portions where the state of bonding is incomplete, making it impossible to maintain the hermetically sealed state. Consequently, the heat insulating effect deteriorates appreciably, and water droplets and the like can occur on the film layers. Therefore, there is a need to remove the film layers at the peripheral portions so as to bond the glass plates and the butyl rubber which are easily bonded to each other.

In conjunction with the trend of automation of the motor vehicle traffic system in recent years, for example, automatic collection of a toll and the like is planned to be implemented in which an information recording medium such as a card is set on the windshield glass side in a vehicle, and the relevant information is automatically read from outside the vehicle by light rays for reading the information recorded on the card or the like. However, in the case where the film layers for shielding heat rays, ultraviolet rays, or the like are formed in the windshield glass of the vehicle, the transmittance of the reading light rays declines when the light rays are transmitted through the film layers, so that it is difficult to always reliably read the information recorded on the card or the like. Further, a stop lamp is provided on the rear window glass side inside a vehicle so as to rouse the attention of a following vehicle when a vehicle during traveling undergoes deceleration, stopping, or the like. However, in the case where the film layers (particularly dark-colored film layers) are formed in the rear window glass, when the light rays emitted from the stop lamp are transmitted through the film layers, the transmittance of the light rays declines. Hence, it is impossible to rouse sufficient attention of the following vehicle, and there is a risk of leading to a traffic accident such as a collision from behind. Accordingly, there is a need to enhance the transmittance of such light rays by removing (cutting off) the film layers in regions where the reading light rays and the light rays of the stop lamp are transmitted.

For the above reasons, regions and portions for which the film layers in the glass plates need to be removed are tending to increase.

Incidentally, in the case of removing a film layer for shielding heat rays, ultraviolet rays, visible rays, or the like, which is formed on one surface of a glass plate used for a vehicle, a general building, or the like for the purpose of maintenance of health, improvement of comfort, securing of privacy, and the like, the film layer in a specific region of the glass plate is conventionally removed while numerically controlling the movement of one removing head.

However, since the regions and portions for which the film layers in the glass plates need to be removed are tending to increase, as described above, a long time is required for removing the film layers in predetermined regions of the glass plates in a case where the single removing head is used. Hence, the improvement of productivity of these glass plates has been difficult, and has been a problem particularly in the working of window glass for motor vehicles for which high productivity is required.

SUMMARY OF THE INVENTION

The present invention has been devised in view of the above-described aspects, and its object is to provide a method of and an apparatus for removing a film layer in a specific region of a glass plate in a short time, and a glass-plate working apparatus having that apparatus.

To this end, in accordance with a first aspect of the invention, there is provided a method of removing a film layer on a glass plate, comprising the steps of: defining in a divided manner a region of a film layer to be removed on a glass plate; and concurrently effecting removal of the film layer on the glass plate in an apportioned manner with respect to respective divided regions defined in the divided manner.

In the method of removing a film layer on a glass plate in accordance with the invention, the region of the film layer to be removed on the glass plate is preferably defined in a divided manner in accordance with at least any one of conditions including its area, shape, and removal time.

According to the method of removing a film layer on a glass plate in accordance with the invention, since the region of the film layer to be removed on the glass plate is defined in a divided manner, preferably defined in a divided manner in accordance with at least any one of conditions including its area, shape, and removal time, and the removal of the film layer on the glass plate is concurrently effected in an apportioned manner with respect to divided regions defined in the divided manner, the film layer in a specific region of the glass plate can be removed in a short time.

In the method of removing a film layer on a glass plate in accordance with the invention, the region of the film layer to be removed on the glass plate may preferably be defined in the divided manner such that areas of the respective divided regions assume mutually substantially identical areas, or such that durations of removal time for removing the film layer in the respective divided regions are set to mutually substantially identical durations. Since the region of the film layer to be removed on the glass plate is defined in the divided manner such that areas of the respective divided regions assume mutually substantially identical areas, or such that durations of removal time for removing the film layer in the respective divided regions are set to mutually substantially identical durations, the respective operations of removing the film layer in the regions to be removed on the glass plate can be effected in a mutually complementary manner. Thus, the film layer in a specific region of the glass plate can be removed in a short time.

In the method of removing a film layer on a glass plate in accordance with the invention, a position at which the removal of the film layer is started in each of the divided regions is preferably determined in accordance with the shape of each of the divided regions.

In accordance with a second aspect of the invention, there is provided an apparatus for removing a film layer on a glass plate, comprising: at least first and second removing means for removing a film layer on a glass plate, wherein a region of a film layer to be removed on a glass plate is defined in a divided manner, and with respect to divided regions defined in the divided manner the removal of the film layer on the glass plate is effected concurrently by being apportioned to the first and second removing means.

In the apparatus for removing a film layer on a glass plate in accordance with the invention, the region of the film layer to be removed on the glass plate is preferably defined in the divided manner in accordance with at least any one of conditions including its area, shape, and removal time.

According to the apparatus for removing a film layer on a glass plate in accordance with the invention, since the region of the film layer to be removed on the glass plate is defined in a divided manner, preferably defined in a divided manner in accordance with at least any one of conditions including its area, shape, and removal time, and the removal of the film layer on the glass plate is apportioned to the first and second removing means and is concurrently effected by these means in an apportioned manner with respect to divided regions defined in the divided manner, the film layer in a specific region of the glass plate can be removed in a short time.

In the apparatus for removing a film layer on a glass plate in accordance with the invention, the region of the film layer to be removed on the glass plate may preferably be defined in the divided manner such that areas of the respective divided regions assume mutually substantially identical areas, or the region of the film layer to be removed on the glass plate may be defined in the divided manner such that durations of removal time for removing the film layer in the respective divided regions are set to mutually substantially identical durations. Since the region of the film layer to be removed on the glass plate is defined in the divided manner such that areas of the respective divided regions assume mutually substantially identical areas, or such that durations of removal time for removing the film layer in the respective divided regions are set to mutually substantially identical durations, the respective operations of removing the film layer in the regions to be removed on the glass plate by the first and second removing means can be effected in a mutually complementary manner. Thus, the film layer in a specific region of the glass plate can be removed in a short time.

In the apparatus for removing a film layer on a glass plate in accordance with the invention, a position at which the removal of the film layer is started in each of the divided regions by the first and second removal means is determined in accordance with the shape of each of the divided regions. Since the position at which the removal of the film layer is started in each of the divided regions by the first and second removal means is determined in accordance with the shape of each of the divided regions, the first and second removing means are able to remove the film layer on the glass plate smoothly without interfering with or colliding against each other.

The apparatus for removing a film layer on a glass plate in accordance with the invention preferably further comprises: transporting means for transporting the glass plate, wherein the first and second removing means respectively have grinding wheels for grinding and removing the film layer on the glass plate, the grinding wheels being arranged on both sides of a path for transporting the glass plate by the transporting means.

In accordance with a third aspect of the invention, there is provided a glass-plate working apparatus comprising: the apparatus for removing a film layer on a glass plate according to the second aspect of the invention; bend-breaking means for bend-breaking a glass plate whose film layer has been removed; grinding means for grinding peripheries of the glass plate bend-broken by the bend-breaking means; and transporting means for transporting the glass plate consecutively to the apparatus for removing a film layer, the bend-breaking means, and the grinding means. Further, in this glass-plate working apparatus as well, the first and second removing means may preferably be respectively comprised of grinding wheels for grinding and removing the film layer on the glass plate, the grinding wheels being arranged on both sides of a path for transporting the glass plate by the transporting means.

According to the glass-plate working apparatus in accordance with the invention, the removal of the film layer by the apparatus for removing a film layer on a glass plate, the bend-breaking by the bend-breaking means of the glass plate whose film layer has been removed, and the grinding of the peripheries of the bend-broken glass plate by the grinding means can be effected concurrently. In addition, the removal of the film layer, bend-breaking, and grinding can be effected in an integrated manner in a production line by a single apparatus.

The bend-breaking means of the glass-plate working apparatus in accordance with the invention preferably includes cutting means for forming a cut line for bend-breaking the glass plate whose film layer has been removed and press-breaking means for press-breaking along the cut line the glass plate on which the cut line has been formed.

The above and other objects, features and advantages of the present invention will become more apparent from the following detailed description of the invention when read in conjunction with the accompanying drawings.

DESCRIPTION OF THE PREFERRED EMBODIMENTS

Figure 1:
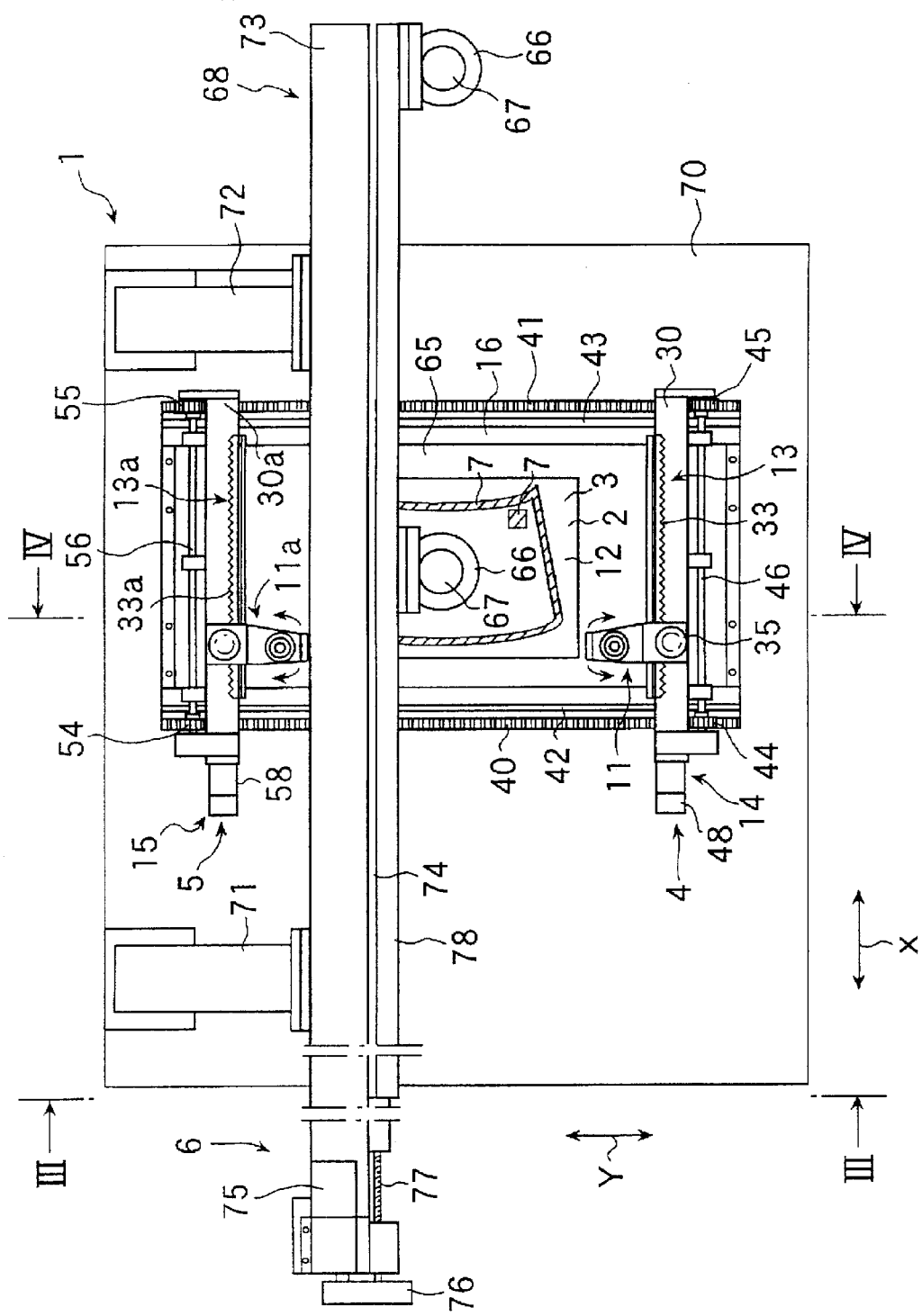
FIG. 1 is an explanatory plan view of an apparatus for removing a film layer on a glass plate in accordance with an embodiment of the invention.

Referring now to the accompanying drawings, a detailed description will be given of the preferred embodiments of the invention. It should be noted that the invention is not limited to these embodiments.

In FIGS. 1 to 5, an apparatus 1 for removing a film layer on a glass plate in accordance with an embodiment of the invention is comprised of: a supporting table 16 for supporting a glass plate 2; removing means 4 and 5 for removing a film layer 3 on the glass plate 2 supported on the supporting table 16; a placing table 80 on the carrying-in side, the glass plate 2 whose film layer 3 is to be removed being placed on the placing table 80; a placing table (not shown) on the carrying-out side, on which the glass plate 2 whose film layer 3 has been removed is placed; a transporting means 6 for transporting the glass plate 2 so as to carry in the glass plate 2 placed on the placing table 80 onto the supporting table 16, and so as to carry out the glass plate 2, whose film layer 3 has been removed by the removing means 4 and 5, from the supporting table 16 and place the glass plate 2 on the placing table on the carrying-out side; and a control unit (not shown), e.g., a numerical controller, for defining in a divided manner regions 7 of the film layer 3 to be removed by the removing means 4 and 5 and for causing the removing means 4 and 5 to concurrently effect the removal of the film layer 3 in an apportioned manner with respect to divided regions 8 and divided regions 9 which have been defined in a divided manner.

The removing means 4 includes a removing head 11; an X-direction moving device 13 for moving the removing head 11 in an X direction which is parallel to one surface 12 of the glass plate 2; and a Y-direction moving device 14 for moving the removing head 11 in a Y direction which is perpendicular to the X direction and is parallel to one surface 12 of the glass plate 2. Meanwhile, the removing means 5 includes a removing head 11a; an X-direction moving device 13a for moving the removing head 11a in the X direction; and a Y-direction moving device 15 for moving the removing head 11a in the Y direction. The X-direction moving device 13 and the Y-direction moving device 14 are adapted to move the removing head 11 in the X direction and the Y direction, respectively, i.e., move the removing head 11 in X-Y plane coordinates, while the X-direction moving device 13a and the Y-direction moving device 15 are adapted to move the removing head 11a in the X direction and the Y direction, respectively, i.e., move the removing head 11a in X-Y plane coordinates.

The removing heads 11 and 11a in this embodiment are formed in a mutually similar manner, and the X-direction moving devices 13 and 13a are also formed in a mutually similar manner. Accordingly, a description will be given hereafter of the removing head 11 and the X-direction moving device 13, and as for the removing head 11a and the X-direction moving device 13a, a reference character 'a' will be added to the reference numerals of their component parts in the drawings, as required, and a description thereof will be omitted.

The removing head 11 includes a disk-shaped grinding wheel 20; an electric motor 21 for rotating the grinding wheel wheel 20; a swiveling means 22 for swiveling the grinding wheel 20; and an air cylinder unit 23 for raising or lowering the grinding wheel 20. The electric motor 21 is disposed such that the direction in which its output rotating shaft extends constantly coincides with a direction parallel to one surface 12 of the glass plate 2, and is attached to a lower end of a spline shaft 27, which will be described later, by means of a bracket 24. The grinding wheels 20 and 20a are arranged on both sides of the path for transporting the glass plate 2 by the transporting means 6.

The grinding wheel 20 is mounted on the output rotating shaft of the electric motor 21, and is adapted to rotate by using the output rotating shaft as its axis. The grinding wheel 20 is adapted to grind and remove the film layer 3 by being brought into contact with the film layer 3 at a cylindrical outer periphery 25 of the grinding wheel 20 by the actuation of the air cylinder unit 23 while the grinding wheel 20 is being rotated by the operation of the electric motor 21. It should be noted that the position of contact between the cylindrical outer periphery 25 of the grinding wheel 20 and the film layer 3 is located on a swiveling axis extending in a Z direction which is perpendicular to the X direction and the Y direction in which the grinding wheel 20 is swiveled by the swiveling means 22.

The swiveling means 22 has an electric motor 26 mounted on a movable base 32 which will be described later, and the spline shaft 27 which also serves as an output rotating shaft of the electric motor 26. The spline shaft 27 is disposed in such a manner as to penetrate a rotor of the electric motor 26 and extend in the Z direction, and is splined to the rotor of the electric motor 26 in such a manner as to be vertically movable with respect to the rotor. As the electric motor 26 is operated, the spline shaft 27 rotates, and the grinding wheel 20 attached to the lower end of the spline shaft 27 by means of the bracket 24 and the electric motor 21, in turn, rotates, i.e., swivels.

A cylinder of the air cylinder unit 23 is attached to the movable base 32 via the electric motor 26, and one end of a piston rod of the air cylinder unit 23 extending in the Z direction is coupled to an upper end of the spline shaft 27 by means of a thrust bearing or the like (not shown). As the air cylinder unit 23 is actuated, its piston rod vertically moves in the Z direction, which in turn causes the spline shaft 27 coupled to the piston rod to move vertically, thereby raising or lowering the grinding wheel 20 via the bracket 24 attached to the lower end of the spline shaft 27 as well as the electric motor 21. Incidentally, as the means for raising or lowering the grinding wheel 20, a hydraulic cylinder unit may be used instead of the above-described air cylinder unit 23.

It should be noted that the removing head 11 may be arranged such that, as described in the specification of Japanese Patent Application No. 2000-007209, the electric motor 21 is mounted on the bracket 24 such that the output rotating shaft of the electric motor 21 extends in such a manner as to be inclined toward a direction parallel to one surface 12 of the glass plate 2 with respect to the Z direction, so that the grinding wheel 20 is inclined toward a direction parallel to one surface 12 of the glass plate 2 with respect to the Z direction.

The X-direction moving device 13 includes a movable frame 30 extending in the X direction; a pair of guide rails 31 attached to the movable frame 30 and extending in the X direction; the movable base 32 which is fitted to the guide rails 31 in such a manner as to be movable in the X direction and on which the removing head 11 is mounted; a toothed rack 33 fixed to the movable frame 30 and extending in the X direction; a pinion 34 meshing with the toothed rack 33; and an electric motor 35 mounted on the movable base 32 and having an output rotating shaft with a tip to which the pinion 34 is secured. As the output rotating shaft of the electric motor 35 is rotated by the operation of the electric motor 35, the pinion 34 meshing with the toothed rack 33 is rotated to move the movable base 32 in the X direction, thereby moving the removing head 11 in the X direction.

The Y-direction moving device 14 includes a pair of toothed racks 40 and 41 which are respectively attached to both ends, in the X direction, of the supporting table 16 in such a manner as to extend in the Y direction; a pair of guide rails 42 and 43 attached to the respective inner sides of the toothed racks 40 and 41 on both ends, in the X direction, of the supporting table 16 in such a manner as to extend in the Y direction; a pair of pinions 44 and 45 meshing with the toothed racks 40 and 41, respectively; a rotating shaft 46 to both ends of which the pinions 44 and 45 are respectively secured and which extends in the X direction; a timing pulley 47 attached to the pinion 44; an electric motor 48 mounted on one end of the movable frame 30; and a timing pulley 49 attached to an output rotating shaft of the electric motor 48 extending in the X direction. The guide rails 42 and 43 are fitted to a slider (not shown) attached to the movable frame 30, so as to guide the movable frame 30 in the Y direction. The rotating shaft 46 is attached to the movable frame 30 so as to be rotatable. A timing belt 51 is trained between the timing pulleys 47 and 49 via a tension pulley 50. As the electric motor 48 is operated, the pinion 44, the rotating shaft 46, and the pinion 45 are rotated by means of the timing pulleys 47 and 49 and the timing belt 51, and the like. This rotation causes the pinions 44 and 45 to move in the Y direction while meshing with the toothed racks 40 and 41. In conjunction with this movement, the movable frame 30 to which the rotating shaft 46 is attached moves in the Y direction, which in turn moves the removing head 11 in the Y direction by means of the movable frame 30, the movable base 32, and the like.

The Y-direction moving device 15 shares the toothed racks 40 and 41 and the guide rails 42 and 43 of the Y-direction moving device 14, and includes pinions 54 and 55 meshing with the toothed racks 40 and 41, respectively; a rotating shaft 56 to both ends of which the pinions 54 and 55 are respectively secured and which extends in the X direction; a timing pulley 57 attached to the pinion 54; an electric motor 58 mounted on one end of the movable frame 30a; and a timing pulley 59 attached to an output rotating shaft of the electric motor 58 extending in the X direction. The guide rails 42 and 43 are fitted to a slider (not shown) attached to the movable frame 30a, so as to guide the movable frame 30a in the Y direction. The rotating shaft 56 is attached to the movable frame 30a so as to be rotatable. A timing belt 61 is trained between the timing pulleys 57 and 59 via a tension pulley 60. As the electric motor 58 is operated, the pinion 54, the rotating shaft 56, and the pinion 55 are rotated by means of the timing pulleys 57 and 59 and the timing belt 61, and the like. This rotation causes the pinions 54 and 55 to move in the Y direction while meshing with the toothed racks 40 and 41. In conjunction with this movement, the movable frame 30a to which the rotating shaft 56 is attached moves in the Y direction, which in turn moves the removing head 11a in the Y direction by means of the movable frame 30a, the movable base 32a, and the like.

The supporting table 16 has a table 65 having an area for supporting the entire plane of the other surface 62 of the glass plate 2 opposing one surface 12 thereof. The table 65 has a plurality of holes 500, and these holes 500 are connected to a vacuum suction pump (not shown) through the piping and valves so as to suck under a vacuum the glass plate 2 on the table 65.

Figure 5:
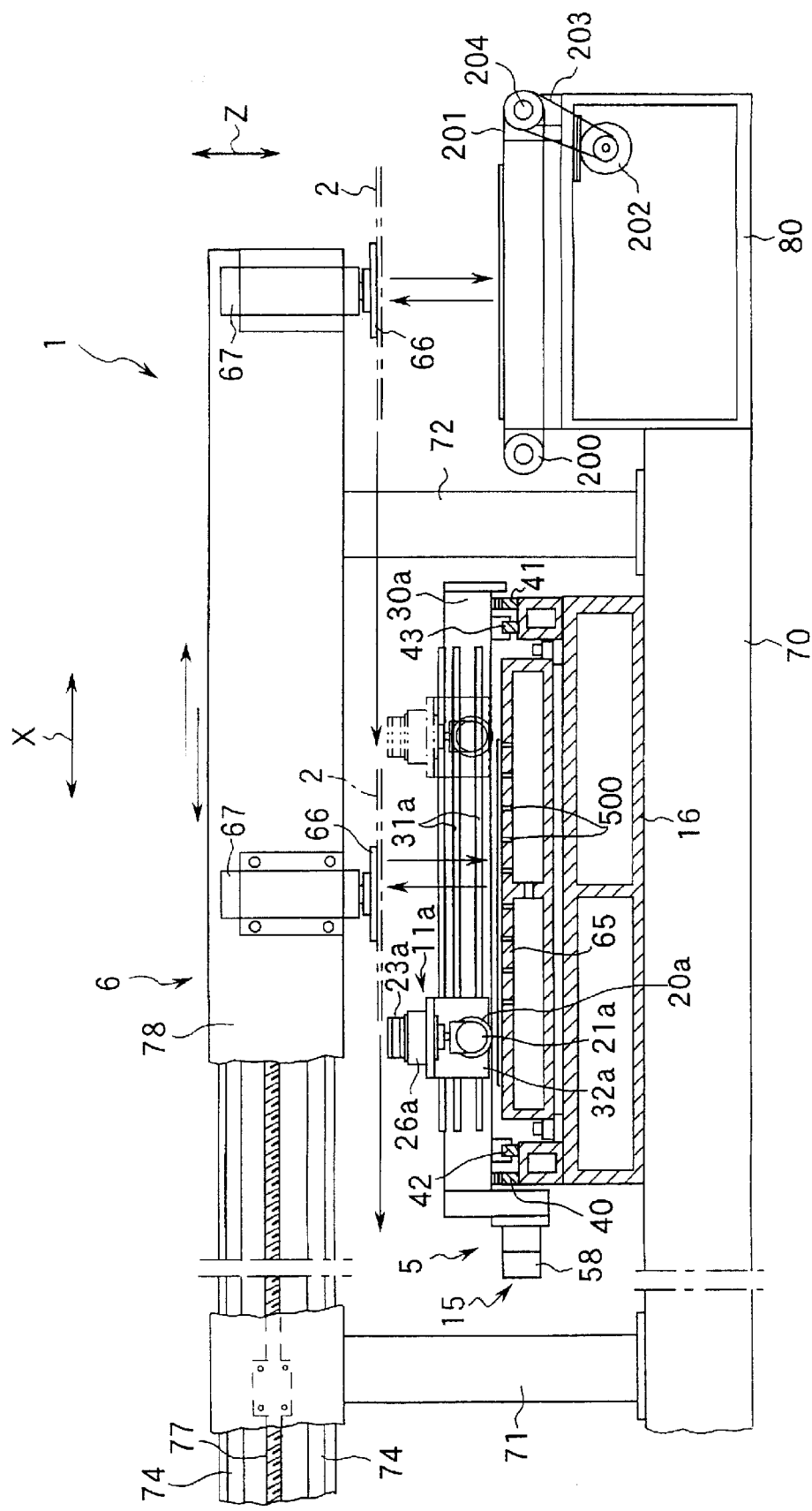
FIG. 5 is an explanatory front elevational view, partly in section, of the embodiment shown in FIG. 1.

The placing table 80 shown in FIG. 5 has a plurality of endless belts 201 trained between pulleys 200 and an electric motor 202 for causing the endless belts 201 to travel. The electric motor 202 is coupled via a pulley, a belt, and the like 203 to a rotating shaft 204 attached to the pulley 200 and extending in the Y direction. As the electric motor 202 is operated, the rotating shaft 204 is rotated, which in turn causes the plurality of endless belts 201 to travel in the X direction. Since the placing table on the carrying-out side is formed in the same way as the placing table 80, a description of this placing table will be omitted.

The transporting means 6 includes two holding devices 66 for sucking and holding the glass plate 2; two air cylinder units 67 for raising or lowering the holding device 66; and a moving device 68 for moving the air cylinder unit 67 in the X direction. The holding devices 66 and the air cylinder units 67 are provided on a slider 78 which will be described later.

Each holding device 66 has suction portions (not shown) connected to a vacuum suction pump (not shown) via the piping and valves. As the vacuum suction pump is operated, the glass plate 2 is sucked and held at its one surface 12 by the suction portions.

In each air cylinder unit 67, the holding device 66 is attached to an outer tip of its piston rod extending in the Z direction. To prevent the glass plate 2 sucked and held by the holding device 66 from rotating, the piston rod of the air cylinder unit 67 is prevented from rotating relative to its cylinder and the holding device 66. As the air cylinder unit 67 is actuated, the holding device 66 is raised or lowered in the Z direction.

The moving device 68 includes an upper frame 73 attached to a base 70 by means of frames 71 and 72 and extending in the X direction; a pair of guide rails 74 attached to the upper frame 73 and extending in the X direction; an electric motor 75 attached to one end of the upper frame 73; a ball screw shaft 77 coupled to an output rotating shaft of the electric motor 75 by means of a pulley, a belt, and the like 76 and supported rotatably on the upper frame 73 via bearings (not shown) at its opposite ends in such a manner as to extend in the X direction; and the slider 78 to which a ball nut (not shown) threadedly engaged with the ball screw shaft 77 is secured. Cylinders (not shown) of the air cylinder units 67 are respectively attached to the slider 78 so that the holding devices 66 are respectively located above a central portion of the table 65 and above a central portion of the placing table 80. As the electric motor 75 is operated, the ball screw shaft 77 is rotated by means of the pulley, the belt, and the like 76, which in turn moves in the X direction the slider 78 to which the ball nut threadedly engaged with the ball screw shaft 77 is secured, thereby causing the air cylinder units 67 mounted on the slider 78 to move in the X direction.

Through a program stored in advance, the control unit of the apparatus 1 for removing a film layer on a glass plate in accordance with this embodiment controls the operation of the electric motors 21, 21a, 26, 26a, 35, 35a, 48, 58, and 75, the air cylinder units 23 and 67, the vacuum suction pumps connected to the plurality of holes in the table 65 through the piping and valves, and the vacuum suction pumps connected to the suction portions of the holding devices 66, so as to control the operation which has been described above and will be described later.

Figure 2:
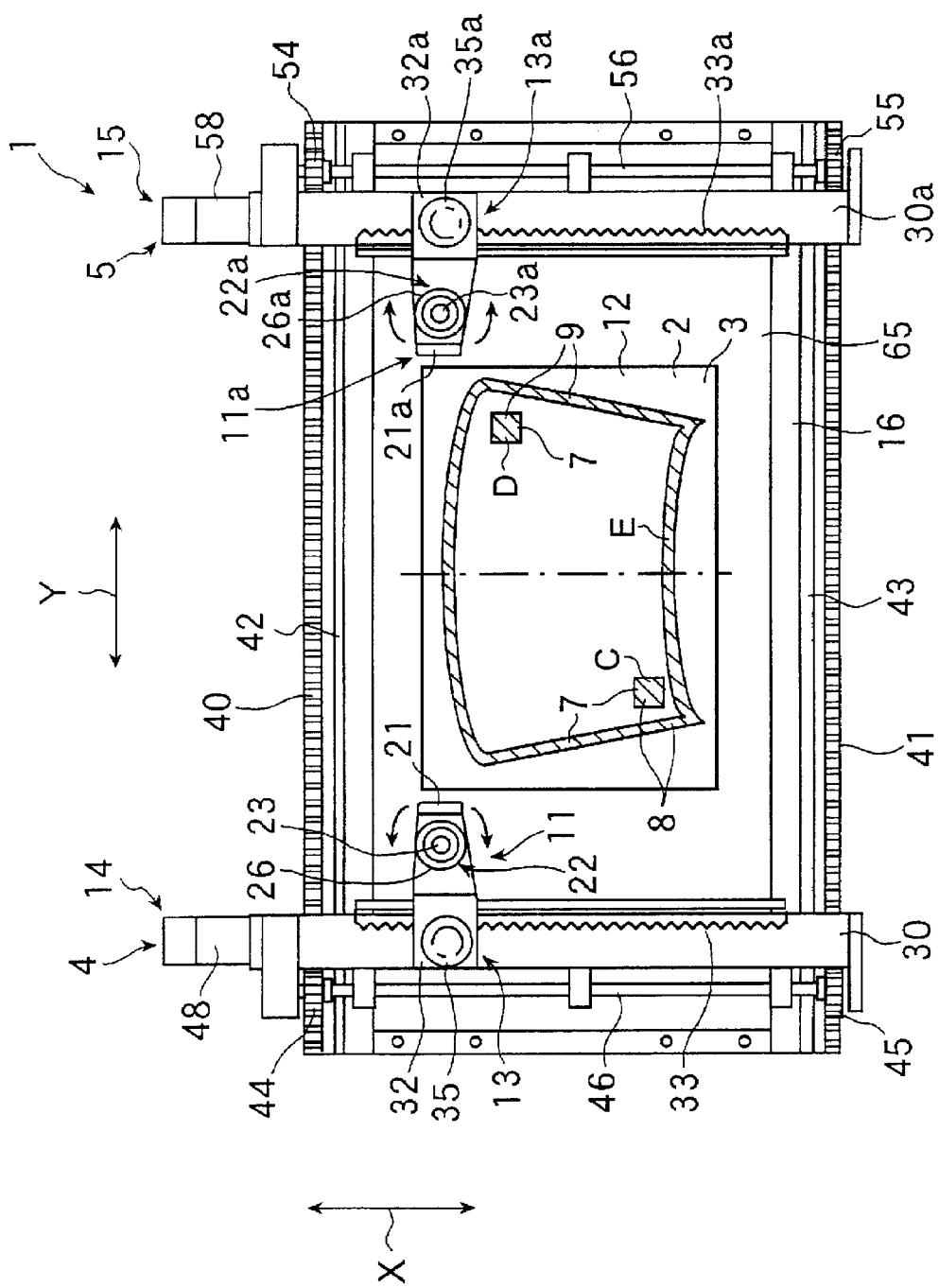
FIG. 2 is an explanatory plan view of the embodiment shown in FIG. 1 with a transporting means omitted.
Figure 3:
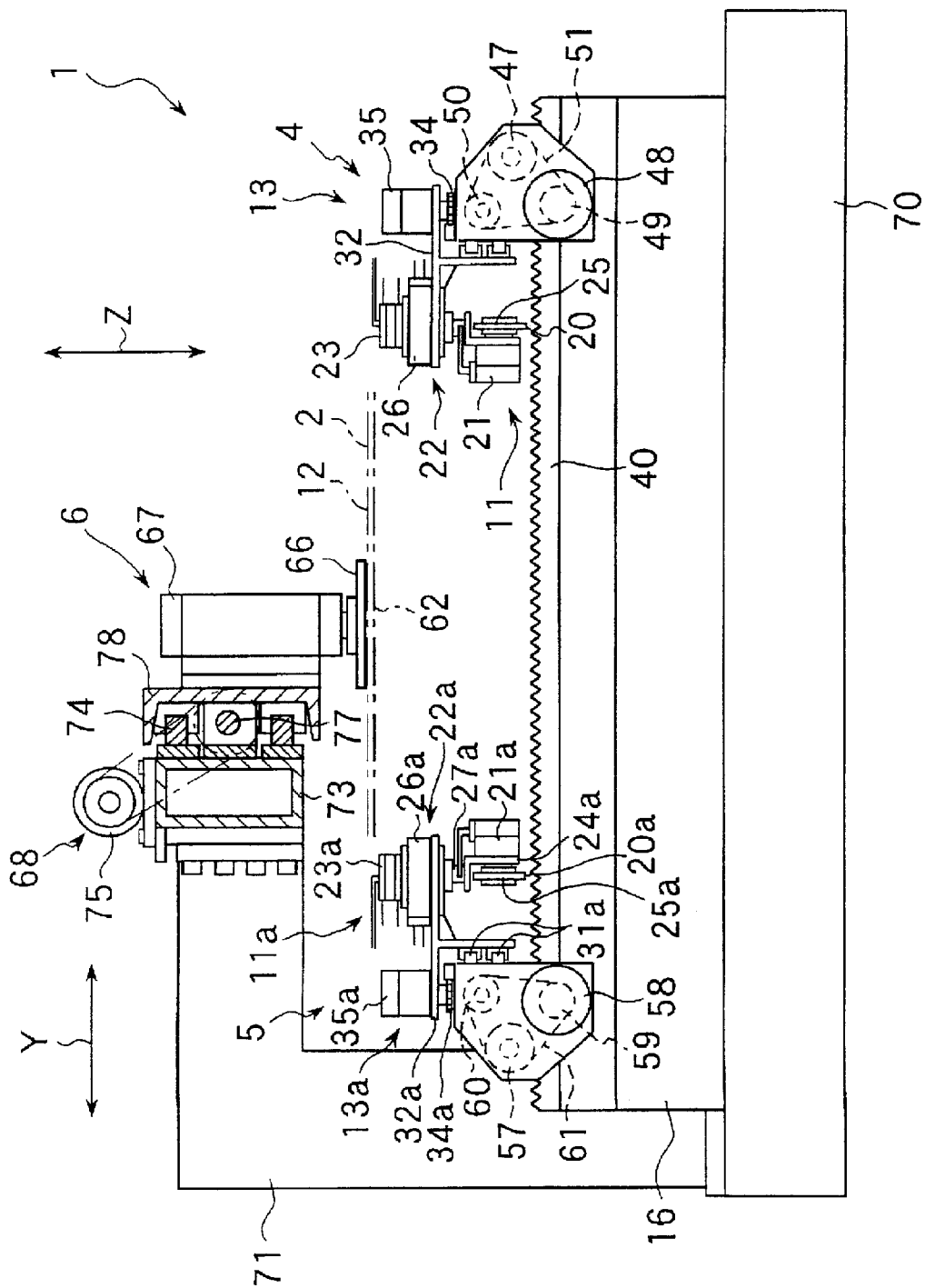
FIG. 3 is an explanatory view, taken in the direction of arrows along line III—III, of the embodiment shown in FIG. 1.
Figure 4:
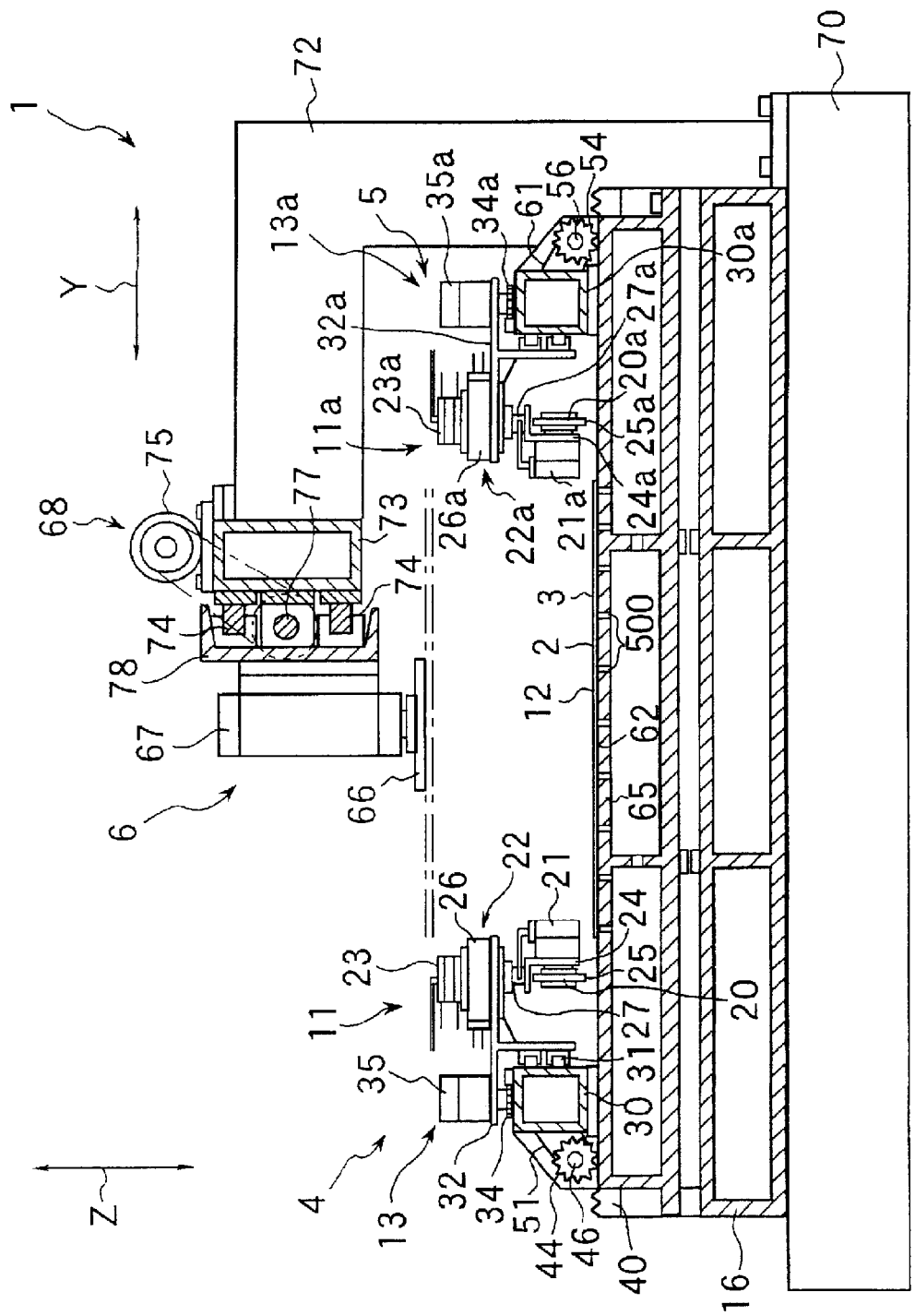
FIG. 4 is an explanatory cross sectional view, taken in the direction of arrows along line IV—IV, of the embodiment shown in FIG. 1.

In the case where the film layer 3 formed on one surface 12 of the glass plate 2 is removed by the apparatus 1 for removing a film layer on a glass plate in accordance with this embodiment, the regions 7 of the glass plate 2 for which the film layer 3 is to be removed are defined in advance by the control unit in a divided manner as the divided regions 8 on the side where the removing head 11 is located and the divided regions 9 on the side where the removing head 11a is located in accordance with conditions such as their areas, shapes, the removal time, and the like. The position in the divided region 8 where the removal of the film layer 3 by the removing means 4 is started and the position in the divided region 9 where the removal of the film layer 3 by the removing means 5 is started are respectively determined on the basis of the shapes of the divided regions 8 and 9 defined in the divided manner. It should be noted that the control unit may be arranged to define the regions 7 in a divided manner such that the areas of the divided regions 8 and 9 respectively assume desired areas, preferably mutually substantially identical areas, or may be arranged to define the regions 7 in a divided manner such that durations of the removal time for removing the film layer 3 in the divided regions 8 and 9 are set to desired durations, preferably mutually substantially identical durations. Furthermore, as shown in FIG. 2, the control unit may divide the regions 7 (portions 7) of the film layer 3 to be removed on the glass plate 2 into an apportioned portion C for which the removal of the film layer 3 is apportioned to the removing means 4, an apportioned portion D for which the removal of the film layer 3 is apportioned to the removing means 5, an apportioned portion E for which the removal of the film layer 3 is apportioned to at least one of the removing means 4 and 5, and so on. In a case where the removal of the film layer 3 at the apportioned portion E is apportioned to both of the removing means 4 and 5, the control unit may control the removing means 4 and 5, respectively, such that the removing heads 11 and 11a effect the removal while approaching each other from positions mutually distanced in the Y direction.

Next, by means of the transporting means 6, the glass plate 2 on the placing table 80 is sucked and held at its one surface 12, is raised, is moved in the X direction, and is lowered, its suction and holding is canceled, and the glass plate 2 is placed on the table 65 of the supporting table 16. The glass plate 2 placed on the table 65 is supported at its other surface 62 by being sucked under a vacuum. As the X-direction moving device 13 and the Y-direction moving device 14 are operated and the X-direction moving device 13a and the Y-direction moving device 15 are operated, the removing heads 11 and 11a on standby at standby positions which will be described later are moved in the X direction and the Y direction within the ranges of the respective divided regions 8 and 9, and the grinding wheels 20 and 20a are respectively positioned at the positions determined in advance. The grinding wheel 20 which has been positioned at the determined position in the divided region 8 and which is rotating by the rotation of the output rotating shaft of the electric motor 21 is lowered by the actuation of the air cylinder unit 23 to bring the cylindrical outer periphery 25 of the grinding wheel 20 into contact with that determined position. The grinding wheel 20 is moved by the operation of the X-direction moving device 13 and the Y-direction moving device 14 while subjecting the grinding wheel 20 to angular control by the swiveling means 22 so that the grinding wheel 20 maintains a fixed angle with respect to its advancing direction, thereby grinding and removing the film layer 3 in the divided region 8. In parallel with the grinding and removal of the film layer 3 by the grinding wheel 20, the grinding wheel 20a which has been positioned at the determined position in the divided region 9 and which is rotating by the rotation of the output rotating shaft of the electric motor 21a is lowered by the actuation of the air cylinder unit 23a to bring the cylindrical outer periphery 25a of the grinding wheel 20a into contact with that determined position. The grinding wheel 20a is moved by the operation of the X-direction moving device 13a and the Y-direction moving device 15 while subjecting the grinding wheel 20a to angular control by the swiveling means 22a so that the grinding wheel 20a maintains a fixed angle with respect to its advancing direction, thereby grinding and removing the film layer 3 in the divided region 9. Namely, the removing means 4 and 5, while being individually (mutually independently) controlled by the control unit, concurrently effect the removal of the film layer 3 in the divided regions 8 and 9 in an apportioned manner. Incidentally, in a case where, in the definition of the regions 7 in a divided manner by the control unit, the area of one of the divided regions 8 and 9 has been set as being 0, e.g., if the area of the divided region 8 is 0, the removing means 5 for effecting the removal of the film layer 3 in the divided region 9 removes the film layer 3 in the regions 7, and the removing means 4 is constantly set on standby. On the other hand, if the area of the divided region 9 is 0, the removing means 4 for effecting the removal of the film layer 3 in the divided region 8 removes the film layer 3 in the regions 7, and the removing means 5 is constantly set on standby. Upon completion of the removal of the film layer 3, the removing heads 11 and 11a are respectively moved for standby to the opposite ends, in the Y direction, of the supporting table 16 as their respective standby positions by the X-direction moving devices 13 and 13a and the Y-direction moving devices 14 and 15.

Next, the vacuum suction of the other surface 62 of the glass plate 2 whose film layer 3 has been removed by the removing means 4 and 5 is canceled. The glass plate 2 on the table 65 for which the vacuum suction has been canceled is sucked and held at its one surface 12, is raised, is moved in the X direction, and is lowered by the transporting means 6. Further, its suction and holding is canceled, the glass plate 2 is placed on the placing table on the carrying-out side, and the endless belts on this placing table on the carrying-out side are caused to travel, thereby carrying out the glass plate 2, for which the removal of the film layer 3 has been performed, from the apparatus 1 for removing a film layer on a glass plate.

Figure 6:
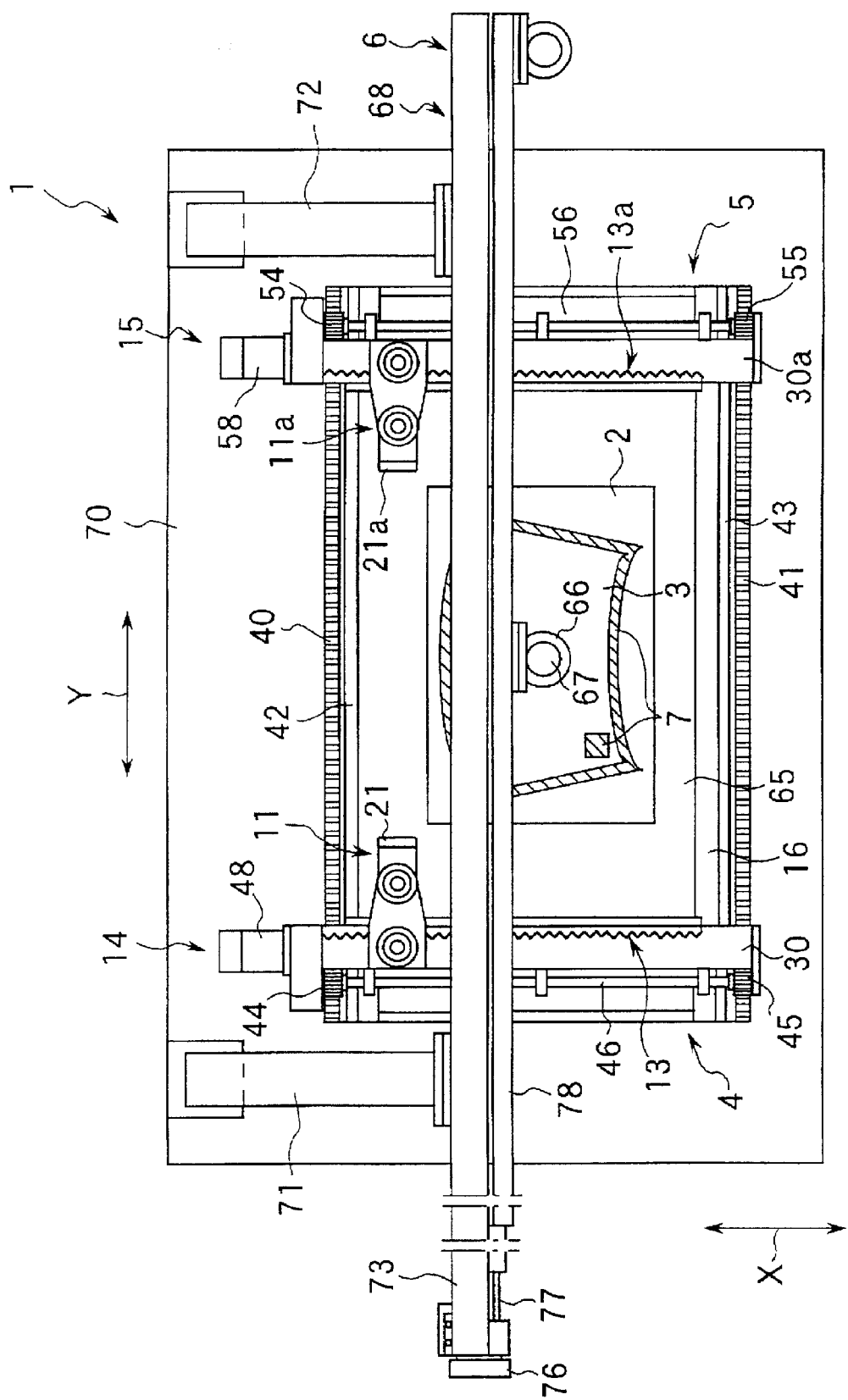
FIG. 6 is an explanatory plan view of a case in which the transporting means of the embodiment shown in FIG. 1 is adapted to transport the glass plate in a Y direction.
Figure 7:
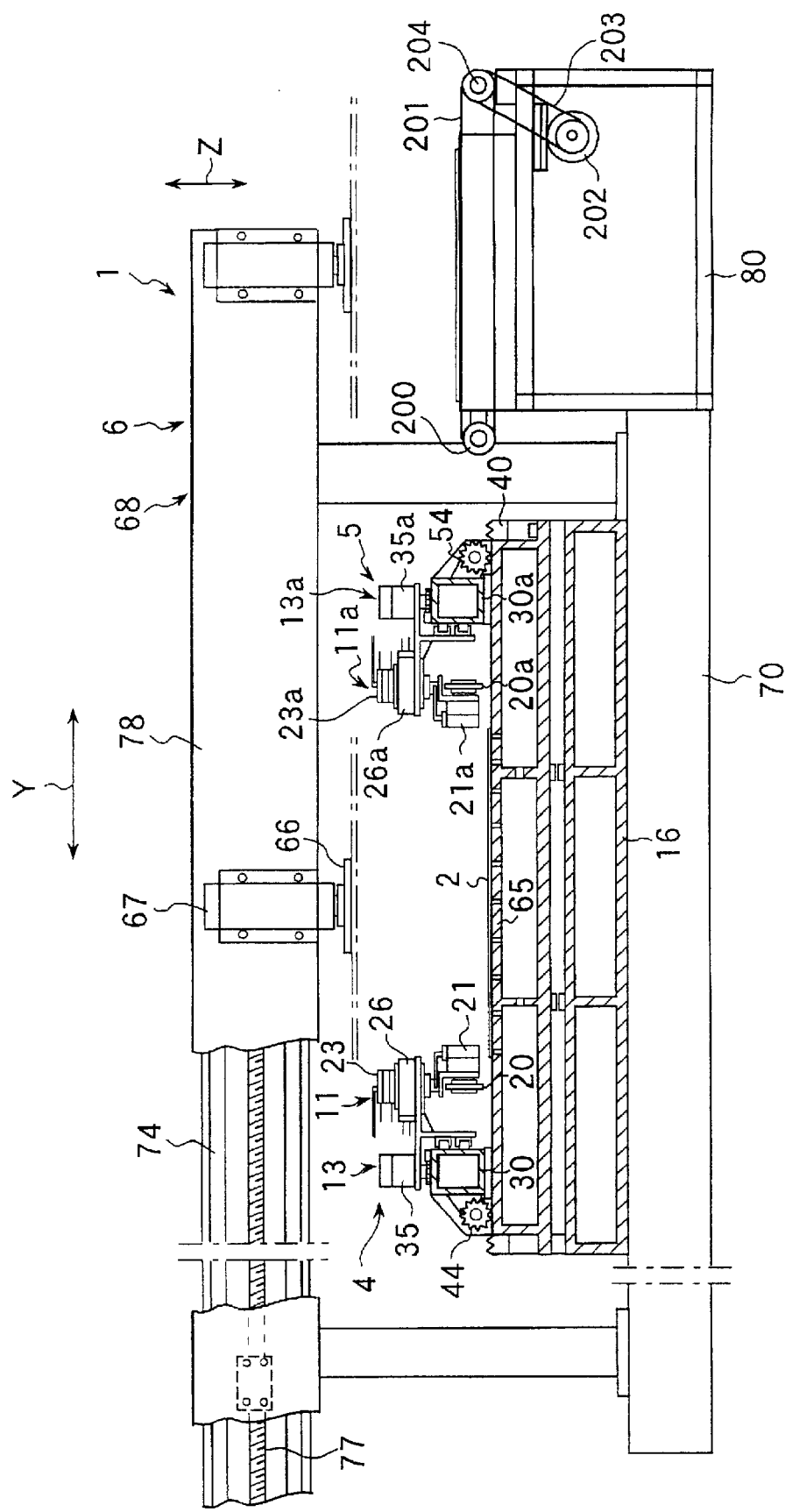
FIG. 7 is an explanatory plan view of the embodiment shown in FIG. 6.

It should be noted that although, with the above-described transporting means 6, the arrangement provided is such that the glass plate 2 is moved in the X direction by the moving device 68, the moving device 68 may be arranged, as shown in FIGS. 6 and 7, by disposing the upper frame 73 so as to extend in the Y direction and by providing the slider 78 on the upper frame 73 so as to be movable in the Y direction, and the glass plate 2 may be moved in the Y direction by the transporting means 6 having such a moving device 68.

Figure 8:
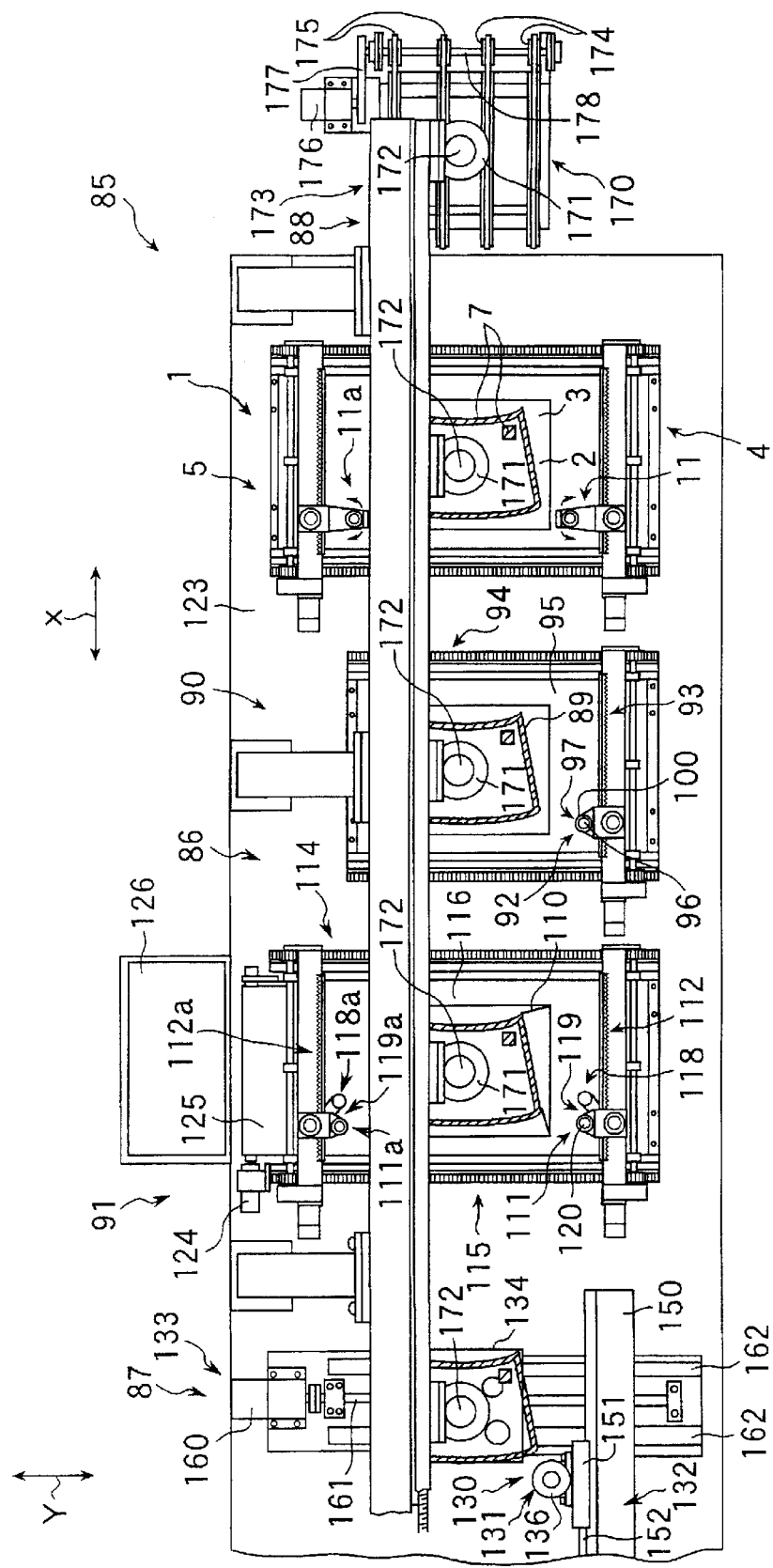
FIG. 8 is an explanatory fragmentary plan view of a glass-plate working apparatus equipped with the apparatus for removing a film layer on a glass plate in accordance with the embodiment shown in FIG. 1.

Next, referring to FIG. 8, a description will be given of a glass-plate working apparatus 85 using the above-described apparatus 1 for removing a film layer on a glass plate. The glass-plate working apparatus 85 is comprised of a placing table 170 on the carrying-in side on which the glass plate 2 to be worked is placed; a placing table (not shown) on the carrying-out side on which the worked glass plate 2 is placed; the above-described apparatus 1 for removing a film layer on a glass plate; a bend-breaking means 86 for bend-breading the glass plate 2 whose film layer 3 has been removed; and a grinding means 87 for grinding the peripheries of the glass plate 2 bend-broken by the bend-breaking means 86. The transporting means of the apparatus 1 for removing a film layer on a glass plate is configured as a transporting means 88 for transporting the glass plate 2 consecutively to the apparatus 1 for removing a film layer, the bend-breaking means 86, and the grinding means 87.

The bend-breaking means 86 includes a cutting means 90 for forming main cut lines 89 for bend-breaking the glass plate 2 whose film layer 3 has been removed and a press-breaking means 91 for press-breaking the glass plate 2, on which the main cut lines 89 have been formed, along the main cut lines 89.

The cutting means 90 includes a cutter head 92, an X-direction moving device 93 for moving the cutter head 92 in the X direction, a Y-direction moving device 94 for moving the cutter head 92 in the Y direction, and a supporting table 95 for supporting the glass plate 2.

The cutter head 92 has a cutter wheel, an air cylinder unit 96 for raising or lowering the cutter wheel, and a swiveling means 97 for subjecting the cutter wheel to swiveling control (angular control) so that its blade constantly maintains a cut-line forming direction. The swiveling means 97 has an electric motor 100 and a spline shaft which is vertically movable in the Z direction. This spline shaft has a lower end to which the cutter wheel is rotatably attached and an upper end to which a piston rod of the air cylinder unit 96 extending in the Z direction is attached.

The X-direction moving device 93, the Y-direction moving device 94, and the supporting table 95 are respectively formed in the same way as the X-direction moving device 13, the Y-direction moving device 14, and the supporting table 16, respectively, of the above-described apparatus 1 for removing a film layer on a glass plate. Accordingly, a description of the X-direction moving device 93, the Y-direction moving device 94, and the supporting table 95 will be omitted.

The press-breaking means 91 includes a pair of press-breaking heads 111 and 111a for forming edge cut lines 110 and press-breaking the glass plate 2 along the main cut lines 89; an X-direction moving device 112 for moving the press-breaking head 111 in the X direction; an X-direction moving device 112a for moving the press-breaking head 111a in the X direction; a Y-direction moving device 114 for moving the press-breaking head 111 in the Y direction; a Y-direction moving device 115 for moving the press-breaking head 111a in the Y direction; and a supporting device 116 for supporting the glass plate 2.

The press-breaking heads 111 and 111a are formed in a mutually similar manner, and the X-direction moving devices 112 and 112a are also formed in a mutually similar manner. Accordingly, a description will be given hereafter of the press-breaking head 111 and the X-direction moving device 112, and as for the press-breaking head 111a and the X-direction moving device 112a, a reference character 'a' will be added to the reference numerals of their component parts, as required, and a description thereof will be omitted.

The press-bending head 111 has an edge-cut-line forming means 118 for forming the edge cut lines 110 on the glass plate 2 and a pressing means 119 for pressing the glass plate 2, on which the main cut lines 89 and the edge cut lines 110 have been formed, along the main cut lines 89.

The edge-cut-line forming means 118 has a cutter wheel, an air cylinder unit for raising or lowering the cutter wheel, and a swiveling means consisting of an electric motor for subjecting the cutter wheel to swiveling control (angular control) and a spline shaft which is vertically movable in the Z direction, so that its blade constantly maintains a cut-line forming direction. This spline shaft has a lower end to which the cutter wheel is rotatably attached and an upper end to which a piston rod of the air cylinder unit extending in the Z direction is attached.

The pressing means 119 includes a push rod and an air cylinder unit 120 having a piston rod which has one end to which the push rod is attached. As the air cylinder unit 120 is actuated, the push rod is raised or lowered in the Z direction.

The X-direction moving device 112, the Y-direction moving device 114, and the Y-direction moving device 115 are respectively formed in the same way as the X-direction moving device 13, the Y-direction moving device 14, and the Y-direction moving device 15, respectively, of the above-described apparatus 1 for removing a film layer on a glass plate. Accordingly, a description of the X-direction moving device 112 and the Y-direction moving devices 114 and 115 will be omitted.

The supporting device 116 includes an electric motor 124 mounted on a base 123; a flexible endless belt 125 which is rotatably supported on the base 123 by means of a pair of frames extending in the Y direction and which is trained between a driving-side drum having one end coupled to an output rotating shaft of the electric motor 124 and a driven-side drum supported rotatably on the base 123 by means of a pair of frames; and a supporting plate which is supported on the base 123 by means of the pair of frames and is disposed on the lower surface of the portion of the endless belt 125 traveling above so as to support the portion of the endless belt 125 traveling above. A cullet accommodating section 126 is provided at a downstream end of the supporting device 116. As for the supporting device 116, to discharge the cullet press-broken by being pressed by the pressing means 119 onto the cullet accommodating section 126, the driven-side drum having one end coupled to the output rotating shaft of the electric motor 124 is rotated by the operation of the electric motor 124, which in turn causes the endless belt 125 to travel. As the endless belt 125 travels, the cullet is moved to the downstream end of the supporting device 116, thereby discharging the cullet onto the cullet accommodating section 126.

The grinding means 87 includes a grinding head 130; an X-direction moving device 132 for moving the grinding head 130 in the X direction relative to the glass plate 2; a Y-direction moving device 133 for moving the grinding head 130 in the Y direction relative to the glass plate 2; and a table 134 for supporting the glass plate 2.

The grinding head 130 includes a grinding wheel; an electric motor having an output rotating shaft to a lower end of which this grinding wheel is secured; and a swiveling means 131 for swiveling the grinding wheel. By rotating the grinding wheel by means of the electric motor, the peripheries of the glass plate 2 are ground.

The swiveling means 131 has an electric motor 136 attached to the slider 151 which will be described later.

The X-direction moving device 132 includes an electric motor mounted on an upper frame 150 as well as a ball screw shaft 152 supported rotatably by the upper frame 150 and threadedly engaged with a ball nut to which the rotation of an output rotating shaft of the electric motor is transmitted by means of a pulley, a belt, and the like and which is secured to a slider 151. The ball screw shaft 152 is rotated by the rotation of the output shaft of the electric motor caused by the operation of the electric motor, which in turn moves the slider 151 in the X direction, thereby causing the grinding head 130 mounted on the slider 151 by means of a bracket to move in the X direction.

The Y-direction moving device 133 includes an electric motor 160 mounted on the base 123 as well as a ball screw shaft 161 which is coupled to an output rotating shaft of the electric motor 160 and is threadedly engaged with a ball nut secured to the table 134. The table 134 is mounted on a pair of guide rails 162, which are provided on the base 123 and extend in the Y direction in parallel to each other, in such a manner as to be movable in the Y direction, and the ball screw shaft 161 is rotatably provided on the base 123. As for the Y-direction moving device 133, the ball screw shaft 161 is rotated by the rotation of the output rotating shaft of the electric motor 160 caused by the operation of the electric motor 160, which in turn causes the table 134 to move in the Y direction. As the table 134 moves in the Y direction, the grinding head 130 is moved in the Y direction relative to the glass plate 2 supported on the table 134.

The table 134 has a suction unit for sucking the glass plate 2 onto its upper surface. As a vacuum suction pump connected to this suction unit via the piping and valves is operated, the suction unit sucks the glass plate 2 placed on the suction unit and thereby causes the glass plate 2 to adhere to the suction unit.

The placing table 170 and the placing table on the carrying-out side where the worked glass plate 2 is placed are formed in a mutually similar manner. Accordingly, a description will be given below of the placing table 170, and a description of the placing table on the carrying-out side will be omitted.

The placing table 170 has a plurality of endless belts 175 trained between pulleys 174 and an electric motor 176 for causing the endless belts 175 to travel. The electric motor 176 is coupled to a rotating shaft 178 attached to the pulley 174 by means of a pulley, a belt, and the like 177 in such a manner as to extend in the Y direction. As the electric motor 176 is operated, the rotating shaft 178 is rotated, which in turn causes the plurality of endless belts 175 to travel in the X direction.

The transporting means 88 includes five holding devices 171 for sucking and holding the glass plates 2, five air cylinder units 172 for raising or lowering the holding devices 171, respectively; and a moving device 173 for moving the air cylinder units 172 in the X direction, the holding devices 171 and the air cylinder units 172 being provided on the moving device 173.

The moving device 173 is formed in the same way as the above-described moving device 68. Accordingly, a description will be given below of only mounting portions of the air cylinder units 172 of the moving device 173.

Cylinders of the air cylinder units 172 are attached to the slider 78 of the moving device 173 at the same intervals in the Y direction, such that the holding devices 171 are respectively located above a central portion of the placing table 170, a central portion of the supporting table 16, a central portion of the supporting table 95, a central portion of the supporting table 116, and the suction unit attached to the table 134.

In the glass-plate working apparatus 85, the removal of the film layer by the apparatus 1 for removing a film layer on a glass plate, the bend-breaking by the bend-breaking means 86 including cutting by the cutting means 90 and press-breaking by the press-breaking means 91, and grinding by the grinding means 87 are respectively effected with respect to separate glass plates 2 concurrently. It should be noted that the glass-plate working apparatus 85 is preferably used for working the glass plates 2 which are used for window glass for vehicles.

With the present invention, it is possible to provide a method of and an apparatus for removing a film layer in a specific region of a glass plate in a short time, and a glass-plate working apparatus having that apparatus.

What is claimed is:

1. An apparatus for removing a film layer on a glass plate, comprising:
   at least first and second removing means for removing a film layer on a glass plate; and
   transporting means for transporting the glass plate,
   said first and second removing means respectively having grinding wheels for grinding and removing the film layer on the glass plate, an X-direction moving device for moving the grinding wheels in an X direction, and a Y-direction moving device for moving the grinding wheels in a Y direction,
   said respective grinding wheels of said first and second removing means being arranged on both sides of a path through which the glass plate is transported by said transporting means,
   said grinding wheel of said first removing means being adapted to be moved in X and Y directions by said X-direction moving device and said Y-direction moving device of said first removing means so as to grind and remove the film layer on the glass plate in a first region on the side of said grinding wheel of said first removing means with respect to said path,
   said grinding wheel of said second removing means being adapted to be moved in X and Y directions by said X-direction moving device and said Y-direction moving device of said second removing means independently from the moving of said grinding wheel of said first removing means so as to grind and remove the film layer on the glass plate in a second region which is different from said first region and which is on the side of said grinding wheel of said second removing means with respect to said path, concurrently with the grinding and removing of the film layer by said grinding wheel of said first removing means in said first region.

2. An apparatus for removing a film layer on a glass plate according to claim 1, wherein said grinding wheel of said first removing means is adapted to grind and remove the film layer on the glass plate in the first region in accordance with at least any one of conditions including area and shape of the film layer to be ground and removed and time required for the grinding and removing in the first region.

3. An apparatus for removing a film layer on a glass plate according to claim 1, wherein said grinding wheel of said second removing means is adapted to grind and remove the film layer on the glass plate in the second region in accordance with at least any one of conditions including area and shape of the film layer to be ground and removed and time required for the grinding and removing in the second region.

4. The apparatus for removing a film layer on a glass plate according to claim 1, wherein said first and second removing means respectively have electric motors having output rotating shafts extending parallel to one surface of the glass plate, said respective grinding wheels of said first and second removing means being adapted to be brought into contact with the film layer on the glass plate at a cylindrical outer periphery of said respective grinding wheels of said first and second removing means, rotated by said output rotating shaft of said electric motor.

5. The apparatus for removing a film layer on a glass plate according to claim 1, wherein the area of the film layer to be removed in the first region and the area of the film layer to be removed in the second region are identical.

6. The apparatus for removing a film layer on a glass plate according to claim 1, wherein the removal time for removing the film layer to be removed in the first region and the removal time for removing the film layer to be removed in the second region are identical.

7. The apparatus for removing a film layer on a glass plate according to claim 1, wherein a position at which the removal of the film layer is started by said first removing means in the first region is determined in accordance with the shape of the film layer on the glass plate in the first region, while a position at which the removal of the film layer is started by said second removing means in the second region is determined in accordance with the shape of the film layer on the glass plate in the second region.

* * * * *